2,788,332

**FOAMED DIISOCYANATE MODIFIED POLY-
ESTERS OF VERY LOW SPECIFIC GRAVITY**

Erwin Müller, Leverkusen-Bayerwerk, and Peter Hoppe, Troisdorf, Germany, assignors to Farbenfabriken Bayer Aktiengesellschaft, Leverkusen, Germany, a corporation of Germany No Drawing. Application January 29, 1953,
Serial No. 334,076

Claims priority, application Germany January 30, 1952

3 Claims. (Cl. 260—2.5)

The present invention relates to the production of foamed plastics of very low specific gravity.

It is known to prepare foamed plastics from the reaction products of linear or branched polyesters with diisocyanates, by reacting these products with water or compounds containing COOH groups. Depending upon the reaction conditions, finely porous or coarsely porous foamed plastics of different specific gravity are thus obtained. The specific gravity can be reduced by carrying out the reaction of the diisocyanate-modified polyester with water in the presence of tertiary bases such as hexahydrodimethylaniline, dimethylpiperazine, and dimethyl-$\beta$-alanine nitrile. The tertiary bases effect a substantial increase in the reaction velocity of the isocyanate groups with the hydroxyl groups both of the polyester and of the water. At the same time, the foaming process is substantially accelerated, which results in a marked decrease in the specific gravity of the foamed plastics thus obtained.

It is the object of the present invention to provide a novel and convenient process for the manufacture of foamed plastics of low specific gravity. Further objects will become apparent as the following description proceeds.

We have found that the reaction taking place between the NCO groups and the polyester on the one hand, and the water on the other hand can be accelerated not only by addition of tertiary bases but also by the incorporation by condensation into the polyester of basic compounds having a tertiary nitrogen atom. More or less strongly basic polyesters are thus produced, which activate the NCO groups left free after the reaction with the excess diisocyanate in such a manner that these NCO groups spontaneously react with water with the formation of foamed plastics of a very low specific gravity.

Accordingly the present invention provides a process for the production of foamed plastics of very low specific gravity, wherein a branched or linear polyester, in which a compound with a tertiary nitrogen atom has been incorporated by condensation, is reacted with a quantity of a polyisocyanate, preferably with a diisocyanate, which is in excess of the quantity calculated on the end groups of the polyester, and the product is reacted in the presence or absence of a tertiary base with water or with a compound which reacts with NCO groups with evolution of gas.

The rate of reaction can be further increased and, at the same time, the specific gravity further decreased by the complementary addition of tertiary bases to the water employed in the reaction. It has thus been found possible for the first time to produce foamed plastics, having a basis of diisocyanate-modified polyesters, which have a specific gravity below 0.01. Despite their low unit weight the foamed plastics thus produced have a considerable mechanical and dynamic strength. They may therefore find application as insulating material for structural elements which are exposed to high dynamic stresses. The properties of the products allow, for instance, of using these very light-weight foamed plastics for all insulation work in house building, for instance in the construction of so-called floating ceilings.

When these very light-weight foamed plastics are used as the core of composite structural members made of foamed isocyanate-modified polyesters of higher specific gravity, structural members of excellent stability are obtained, while the total structural part has a very low specific gravity. Further, a combination of the foamed plastics of very low specific gravity obtained according to the invention with very strong covering layers of metal, wood and plastics, preferably those having a basis of polyester resins, offers great advantages.

The light-weight foamed plastics having a basis of polyurethane may be made by the process of the invention on a technical scale with the aid of mixing apparatus wherein the diisocyanate, preferably toluylene diisocyanate, is injected into the polyester, and after brief further mixing, the reactive mixture of isocyanates and polyesters is cast as a pourable, expansible and reactive mass in moulds. Furthermore, the expansible and reactive mixture produced in the afore-described mixing apparatus can be applied by means of suitable spray apparatus to vertical walls and overhead, the foaming process being accelerated by the choice of suitable additives, for instance the choice of suitable accelerators and water, to such an extent that the expansible mixture immediately expands and does not run down, for instance down vertical walls. When using the modified polyesters, the specific gravity of the resulting foamed plastic can be varied widely by use of appropriate quantities of water and accelerator.

The invention is further illustrated by the following examples:

*Example 1*

10 parts of a polyester prepared from 365 grams of adipic acid, 74 grams of phthalic anhydride, 502 grams of trimethylol propane and 37.5 grams of triethanolamine, which has a hydroxyl number of 250 and an acid number of 1, are carefully mixed with 4 parts by weight of water, 4 parts by weight of an emulsifier and 5 parts by weight of a filler, for instance alumina gel, and induced to foam by the addition of 80 parts by weight of toluylene diisocyanate. The foamed plastic thus obtained has a density of about 0.02 gram/cm.$^3$.

*Example 2*

By adding one part by weight of an activator, for instance hexahydrodimethylaniline, to the reaction mixture of Example 1, foamed plastics having a density of 0.01 gram/cm.$^3$ and less are obtained. When the reactants are mixed in the mixing apparatus described above, a density of less than 0.01 gram/cm.$^3$ can be obtained.

*Example 3*

Instead of using branched basic polyesters as described in Example 1, linear basic polyesters, prepared for instance from diethylene glycol or glycol, adipic acid and methyldiethanolamine, may be employed in the reaction; in contrast to the products obtained by the preceding examples, highly elastic materials of a density of below 0.03 gram/cm.$^3$ may be produced.

Into 100 parts of a linear polyester prepared from 438 grams of adipic acid, 318 grams of diethylene glycol and 29.7 grams of methyldiethanolamine, which has a hydroxyl number of 50 and an acid number of 2, about 3 to 5 percent of a mixture of water and accelerator are incorporated within a short time and 22–25 parts of toluylene diisocyanate are injected into the mixture by means of Bosch pumps and the total mixture is subjected to a short high speed mixing operation so that a readily pourable, expansible and reactive mixture is obtained, which can be made into plates, blocks, foils and other shaped articles of all kinds.

We claim:

1. A process for producing a foamed plastic of very low specific gravity which comprises reacting a polyester condensation product of a polyhydric alcohol, a polyhydric alcohol having a tertiary nitrogen atom and a polybasic carboxylic acid, said compound having terminal hydroxyl and carboxyl groups, with an excess of an organic polyisocyanate over the quantity calculated on the end groups of the polyester and reacting the product thus obtained with water.

2. A process for producing a foamed plastic of very low specific gravity which comprises reacting a polyester condensation product of a polyhydric alcohol, a polyhydric alcohol having a tertiary nitrogen atom and a polybasic carboxylic acid, said compound having terminal hydroxyl and carboxyl groups, with an excess of an organic diisocyanate over the quantity calculated on the end groups of the polyester and reacting the product thus obtained with water.

3. A process for producing a foamed plastic of very low specific gravity which comprises reacting a polyester condensation product of a polyhydric alcohol, a polyhydric alcohol having a tertiary nitrogen atom and a polybasic carboxylic acid, said compound having terminal hydroxyl and carboxyl groups, with an excess of an organic polyisocyanate over the quantity calculated on the end groups of the polyester and reacting the product thus obtained with water in the presence of a catalytic amount of a tertiary amine.

References Cited in the file of this patent

UNITED STATES PATENTS

| | | |
|---|---|---|
| 2,282,827 | Rothrock | May 12, 1942 |
| 2,577,280 | Simon | Dec. 4, 1951 |
| 2,577,281 | Simon | Dec. 4, 1951 |
| 2,591,884 | Simon | Apr. 8, 1952 |
| 2,650,212 | Windemuth | Aug. 25, 1953 |

FOREIGN PATENTS

| | | |
|---|---|---|
| 721,453 | France | Dec. 22, 1931 |
| 821,934 | Germany | Nov. 22, 1951 |